United States Patent
Chang (10) Patent No.: US 11,270,092 B2
(45) Date of Patent: Mar. 8, 2022

(54) FINGERPRINT SENSING APPARATUS AND FINGERPRINT IDENTIFICATION METHOD

(71) Applicant: Jian-Hua Wang, New Taipei (TW)

(72) Inventor: Yung-Ching Chang, Taipei (TW)

(73) Assignee: Jian-Hua Wang, New Taipei (TW)

( * ) Notice: Subject to any disclaimer, the term of this patent is extended or adjusted under 35 U.S.C. 154(b) by 0 days.

(21) Appl. No.: 17/219,906

(22) Filed: Apr. 1, 2021

(65) Prior Publication Data

US 2021/0350108 A1    Nov. 11, 2021

Related U.S. Application Data

(60) Provisional application No. 63/029,729, filed on May 26, 2020, provisional application No. 63/020,030, filed on May 5, 2020.

(30) Foreign Application Priority Data

Feb. 19, 2021    (CN) .......................... 202110191961.5

(51) Int. Cl.
*G06K 9/00*    (2006.01)
*G06N 3/04*    (2006.01)

(52) U.S. Cl.
CPC ....... *G06K 9/00026* (2013.01); *G06K 9/0008* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 2018/0150679 A1 | 5/2018 | Kim et al. | |
| 2019/0228206 A1 | 7/2019 | Baudot et al. | |

FOREIGN PATENT DOCUMENTS

| | | |
|---|---|---|
| CN | 107085827 | 8/2017 |
| CN | 109598182 | 4/2019 |
| CN | 111047522 | 4/2020 |
| TW | I562079 | 12/2016 |
| TW | 201833815 | 9/2018 |

OTHER PUBLICATIONS

"Office Action of Taiwan Counterpart Application", dated Dec. 1, 2021, p. 1-p. 15.

*Primary Examiner* — Nicholas J Lee
(74) *Attorney, Agent, or Firm* — JCIPRNET (57) ABSTRACT

A fingerprint sensing apparatus and a fingerprint identification method are provided. An original fingerprint image is obtained by the fingerprint sensor. An image edge block located at an edge of the original fingerprint image is selected. The image edge block is input into a neural network model to generate a predicted extension block. An extended fingerprint image is generated through merging the original fingerprint image with the predicted extension block. A fingerprint application is executed according to the extended fingerprint image.

16 Claims, 8 Drawing Sheets

FINGERPRINT SENSING APPARATUS AND FINGERPRINT IDENTIFICATION METHOD

CROSS-REFERENCE TO RELATED APPLICATION

This application claims the priority benefits of U.S. provisional application Ser. No. 63/020,030, filed on May 5, 2020; U.S. provisional application Ser. No. 63/029,729, filed on May 26, 2020; and China application serial no. 202110191961.5, filed on Feb. 19, 2021. The entirety of each of the above-mentioned patent applications is hereby incorporated by reference herein and made a part of this specification.

BACKGROUND

Technical Field

The disclosure relates to fingerprint identification technology, and particularly, to a fingerprint sensing apparatus and a fingerprint identification method.

Description of Related Art

In recent years, fingerprint identification technology has been widely used either alone or in combination with various electronic devices or products to provide identity verification, and different fingerprint identification technology, such as at least capacitive, optical, or ultrasonic fingerprint sensing is being continuously developed and improved. It is known that the size of a fingerprint image generated by a fingerprint sensor is relatively small when the sensing distance of the fingerprint sensor is limited due to various considerations. When fingerprint identification is performed according to local fingerprint information provided by a small area fingerprint image, a possible misjudgment may occur due to insufficient fingerprint features or because the fingerprints of different people are partially similar. It is known that a fingerprint image can provide more fingerprint features when the fingerprint image is in a larger size. Moreover, when multiple small area fingerprint images generated by multiple presses are stitched according to the local fingerprint information provided by the small area fingerprint images, there may not be similar image blocks corresponding to the same fingerprint part among the small area fingerprint images, so the image stitching fails.

Therefore, some solutions have been proposed to solve the problems caused by the small area fingerprint image. For example, directly enlarging a small area fingerprint image and then performing fingerprint verification is adopted to increase the size of the fingerprint image to try to increase the quantity of the feature points, but in fact this method does not increase the amount of fingerprint information in the fingerprint image. In addition, stitching multiple small area fingerprint images into a more complete fingerprint image is also proposed. However, as mentioned, when the sensing distance of a fingerprint sensor is relatively small, even if the user presses the fingerprint sensor multiple times, there may not be similar image blocks corresponding to the same fingerprint part among small area fingerprint images. As a result, the image stitching fails.

SUMMARY

In view of this, the disclosure provides a fingerprint sensing apparatus and a fingerprint identification method capable of improving the accuracy and the success rate of fingerprint matching in fingerprint identification.

The embodiments of the disclosure provide a fingerprint sensing apparatus including a fingerprint sensor, a storage device, and a processor. The fingerprint sensor generates an original fingerprint image. The processor is coupled to the fingerprint sensing apparatus and the storage device and configured to execute the following steps. An image edge block located at an edge of the original fingerprint image is selected. The image edge block is input into a neural network model to generate a predicted extension block. An extended fingerprint image is generated through merging the original fingerprint image with the predicted extension block. A fingerprint application is executed according to the extended fingerprint image.

In the embodiments of the disclosure, a fingerprint identification method is provided and adapted for a fingerprint sensing apparatus. The method includes the following steps. An original fingerprint image is obtained by the fingerprint sensor. An image edge block located at an edge of the original fingerprint image is selected. The image edge block is input into a neural network model to generate a predicted extension block. An extended fingerprint image is generated through merging the original fingerprint image with the predicted extension block. A fingerprint application is executed according to the extended fingerprint image.

Based on the above, in the embodiments of the disclosure, the neural network model is trained to generate predicted extension blocks according to the image edge blocks of the original fingerprint image. The predicted extension block may be merged with the original fingerprint image to generate an extended fingerprint image. The extended fingerprint image has more fingerprint features than the original fingerprint image. Accordingly, the success rate of fingerprint matching and the accuracy in fingerprint identification are improved.

In order to make the aforementioned features and advantages of the disclosure comprehensible, embodiments accompanied with drawings are described in detail below.

DESCRIPTION OF THE EMBODIMENTS

In order to make the content of the disclosure easier to understand, the following specific embodiments are illustrated as examples of the actual implementation of the disclosure. Moreover, whenever possible, the same reference numerals are used to represent the same or similar parts in the accompanying drawings and description.

It should be understood that when an element is indicated to be "directly on another element" or "directly connected to" another element, an element in the middle does not exist. For example, "to connect" indicated in the specification may indicate to physically and/or electrically connect. Furthermore, "to electrically connect" or "coupled to" may also be used when other elements exist between two elements.

Figure 1:
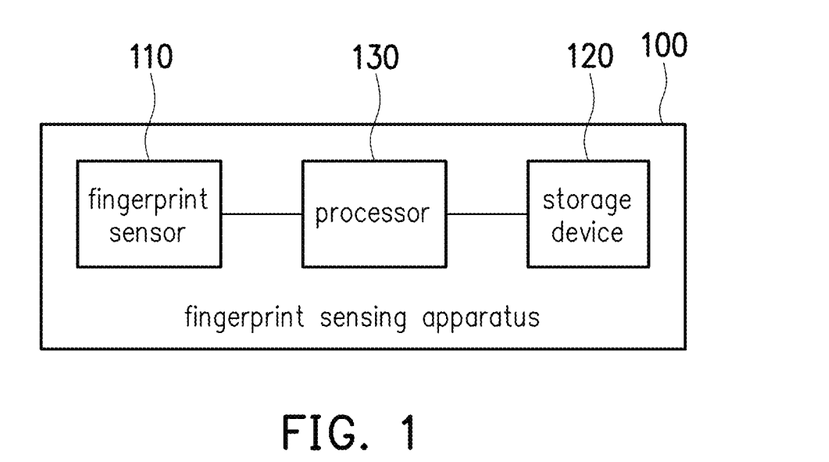
FIG. 1 is a block view of a fingerprint sensing apparatus according to an embodiment of the disclosure.

Referring to FIG. 1, FIG. 1 is a block view of a fingerprint sensing apparatus according to an embodiment of the disclosure. The fingerprint identification device 100 may include a fingerprint sensor 110, a storage device 120, and a processor 130. For example, the fingerprint sensing apparatus 100 is a notebook computer, a smart phone, a panel, a game console, other electronic devices/electrical equipment with the function of fingerprint identification, or the like, and the disclosure is not limited thereto.

The processor 130 may be coupled to the storage device 120 and the fingerprint sensor 110. The processor 130 may include a central processing unit (CPU), an application processor (AP), other programmable general-purpose or special-purpose microprocessors, a digital signal processor (DSP), a programmable controller, an application specific integrated circuit (ASIC), a programmable logic device (PLD), or a combination thereof. In other words, the processor 130 may be implemented by one or more integrated circuits (ICs), and the disclosure is not limited thereto. For example, the processor 130 may include an application processor and a sensing driver IC.

The storage device 120 is adopted to store data, software modules, and program codes. For example, the storage device 120 may be any type of fixed or removable random access memory (RAM), read-only memory (ROM), flash memory, a hard disk or other similar devices, integrated circuits, and a combination thereof. In one embodiment, the processor 130 may load a program code or a module recorded in the storage device 120 to perform the fingerprint identification method proposed in the embodiments of the disclosure.

The fingerprint sensor 110 may perform fingerprint sensing to generate an original fingerprint image. The disclosure does not limit the sensing method of the fingerprint sensor 110. The fingerprint sensor 110 may be an optical fingerprint sensor, an ultrasonic fingerprint sensor, or a capacitive fingerprint sensor. In one embodiment, the fingerprint sensor 110 may have a smaller fingerprint sensing distance, and a small area original fingerprint image is generated according to the local fingerprint.

In one embodiment, the processor 130 may adopt a trained neural network model to accurately predict fingerprint information not sensed by the fingerprint sensor 110 and merge the prediction result with the original fingerprint image to generate an extended fingerprint image. The extended fingerprint image may be adopted in the subsequent fingerprint applications. In this way, the success rate of fingerprint matching of the small area original fingerprint image may be improved, and the problem of failing to stitch images may also be improved.

Figure 2:
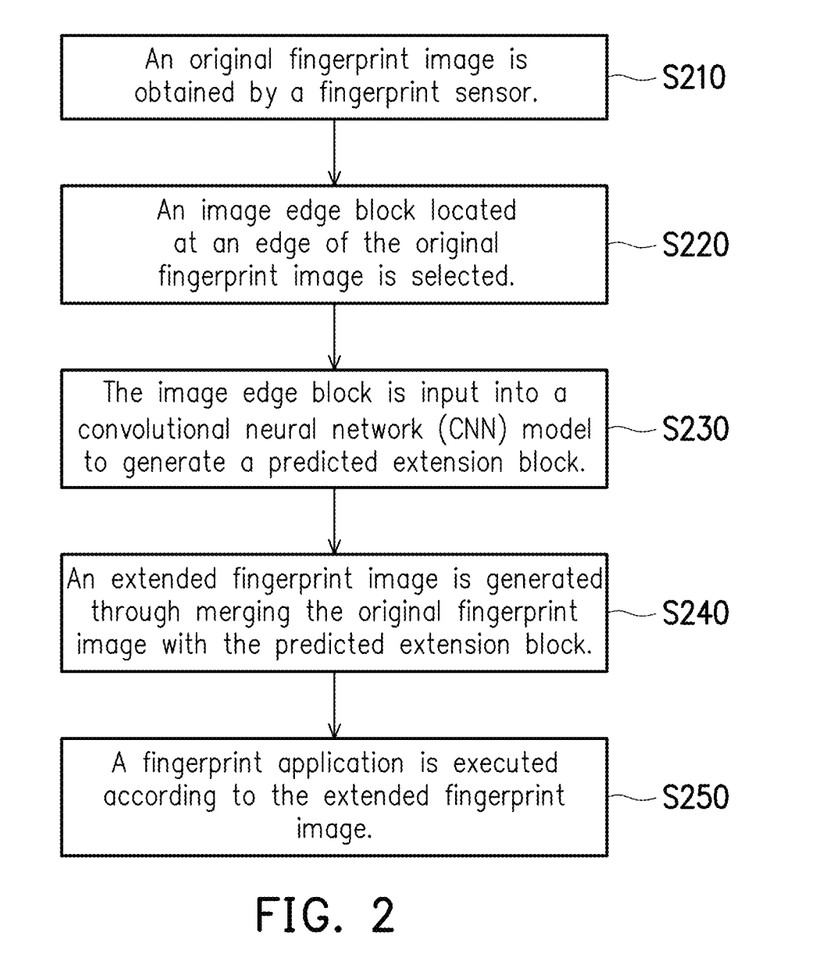
FIG. 2 is a flowchart of a fingerprint identification method according to an embodiment of the disclosure.
Figure 3A:
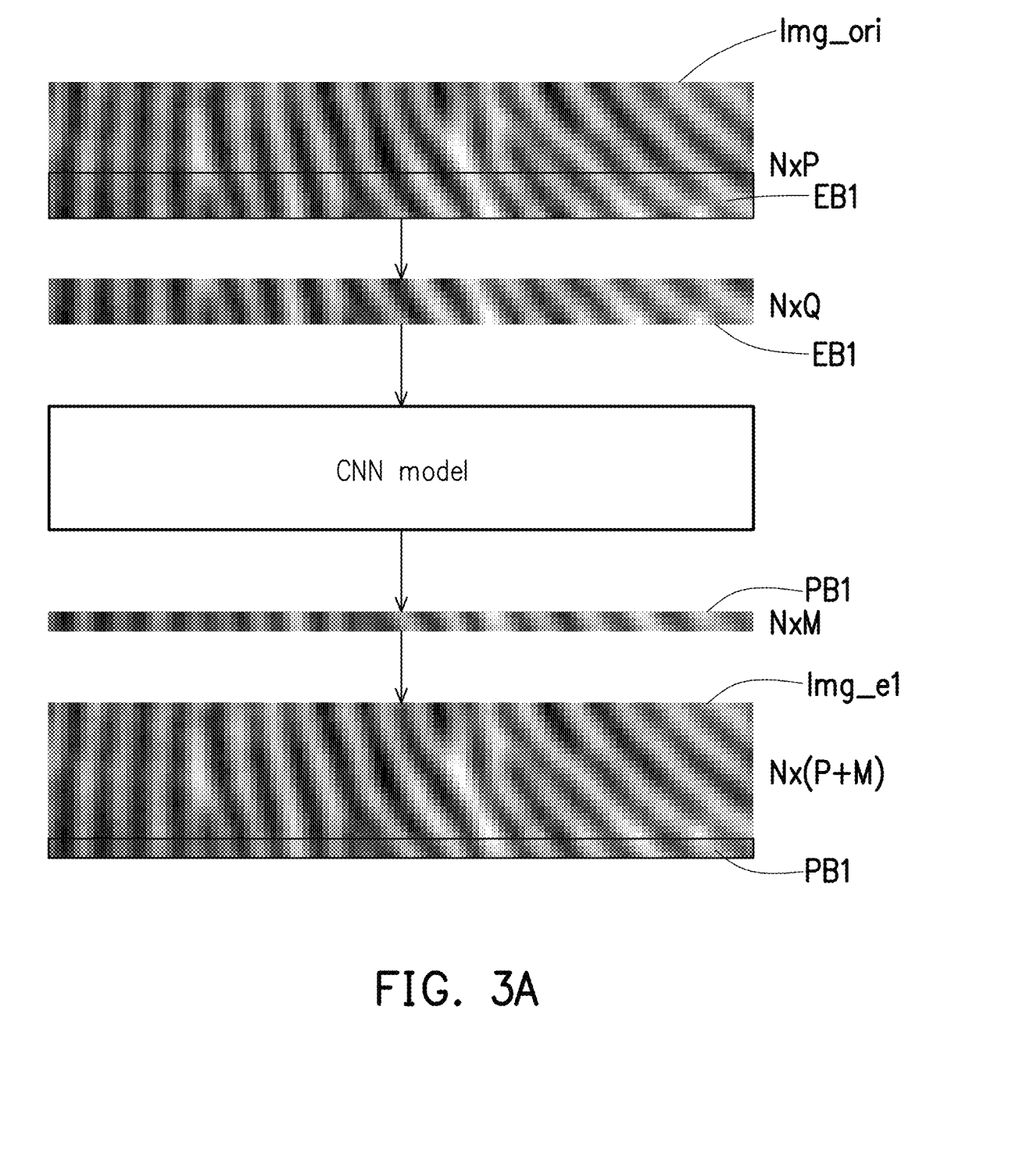
FIG. 3A is a schematic view of a fingerprint identification method according to an embodiment of the disclosure.

FIG. 2 is a flowchart of a fingerprint identification method according to an embodiment of the disclosure. FIG. 3A is a schematic view of a fingerprint identification method according to an embodiment of the disclosure. Referring to FIG. 1, FIG. 2, and FIG. 3A, the method of the embodiment is adapted for the fingerprint sensing apparatus 100 in the foregoing embodiment, and in the following paragraph, the detailed steps of the method in the embodiment are described accompanying with each component in the fingerprint sensing apparatus 100 and the embodiment of FIG. 3A.

In step S210, the original fingerprint image is obtained by the fingerprint sensor 110. When the user places a finger on the fingerprint sensor 110, the fingerprint sensor 110 may generate an original fingerprint image Img_ori according to the sensing data output by each sensing unit in the fingerprint sensor 110. In the embodiment of FIG. 3A, the fingerprint sensor 110 may generate the original fingerprint image Img_ori of the size N*P. That is, the original fingerprint image Img_ori includes N*P pixels.

In step S220, the processor 130 selects an image edge block located at an edge of the original fingerprint image. Meanwhile, the image edge block is an image block extending inward from a certain edge of the original fingerprint image. The disclosure does not limit the size of the image edge block, which may be configured according to actual requirements. FIG. 3A is an embodiment illustrating that the processor 130 selects an image edge block EB1 located at the lower edge of the original fingerprint image Img_ori, but the processor 130 may select image edge blocks located at any edge (e.g., the upper edge, the lower edge, the left edge, or the right edge) of the original fingerprint image Img_ori, which is not limited in the disclosure. In the embodiment of FIG. 3A, the size of the image edge block EB1 is N*Q, where Q is less than P. That is, the image edge block EB1 includes N*Q pixels.

In step S230, the processor 130 inputs the image edge blocks to the neural network model to generate predicted extension blocks. That is, the neural network model may generate predicted extension blocks output by the model according to image edge blocks input into the model. In one embodiment, the neural network model is trained to predict fingerprint information that has not been selected in reality. In one embodiment, the neural network model may be a convolutional neural network (CNN) model. Meanwhile, the size of the predicted extension block output by the model is less than the size of the image edge block input into the model, but the actual size may be designed according to actual requirements, and the disclosure is not limited thereto. In the embodiment of FIG. 3A, the processor 130 inputs the image edge block EB1 to the neural network model to generate a predicted extension block PB1. The size of the predicted extension block PB1 is N*M, where M is less than Q. That is, the predicted extension block PB1 includes N*M predicted extension pixels.

In step S240, the processor 130 generates an extended fingerprint image by merging the predicted extension block with the original fingerprint image. Since the image edge block input into the model is located at a certain edge of the original fingerprint image, the processor 130 may adhere the predicted extension block to the certain edge of the original fingerprint image. In one embodiment, the predicted extension block may include multiple predicted extension pixels. According to the edge where the image edge block is located, the processor 130 may merge the predicted expansion pixels with the vertical edge or the horizontal edge of the original fingerprint image, and the predicted expansion pixels become pixels of the extended fingerprint image. In the embodiment of FIG. 3A, after adhering the predicted extension block PB1 to the lower edge (i.e. the horizontal edge) of the original fingerprint image Img_ori, the processor 130 may generate an extended fingerprint image Img_e1 of the size N*(P+M).

Note that the neural network model is generated and trained according to authentic fingerprint images, so it may accurately predict fingerprint information that is not sensed by the fingerprint sensor. Compared to simply extending the fingerprint from the original fingerprint image, with the neural network model, the bifurcation, turning, spiral, or other special directions of the fingerprint may be predicted in a more precise manner in the embodiment of the disclosure.

In step S250, the processor 130 executes a fingerprint application according to the extended fingerprint image. The fingerprint application may include a fingerprint registration process, a fingerprint verification process, or other related processes or programs requiring fingerprint images. In one embodiment, in a fingerprint verification process, the processor 130 may perform the operation of capturing fingerprint feature points from the extended fingerprint image to obtain multiple fingerprint feature points from the extended fingerprint image. Therefore, the processor 130 may determine whether the obtained fingerprint feature points match the registration template feature points to obtain a fingerprint verification result. In one embodiment, in a fingerprint registration process, the processor 130 may perform the operation of capturing fingerprint feature points from the extended fingerprint image to obtain the registration template feature points and record them. In one embodiment, the user may press on the fingerprint sensor 110 with different parts of the fingers, and the processor 130 may repeat steps S210 to S240 to generate multiple extended fingerprint images. According to the overlapping areas among the multiple extended fingerprint images, the processor 130 may perform image stitching on the multiple extended fingerprint images to generate a complete fingerprint image. The complete fingerprint image may also be adopted in a fingerprint verification process or a fingerprint registration process.

Note that FIG. 3A is an embodiment illustrating that the image edge block EB1 is selected from the horizontal edge of the original fingerprint image Img_ori and the predicted extension block PB1 is merged with the horizontal edge of the original fingerprint image Img_ori, but the disclosure is not limited thereto. In one embodiment, the processor 130 may select the image edge block from the vertical edge of the original fingerprint image and merge the corresponding predicted extension block with the vertical edge of the original fingerprint image.

Figure 3B:
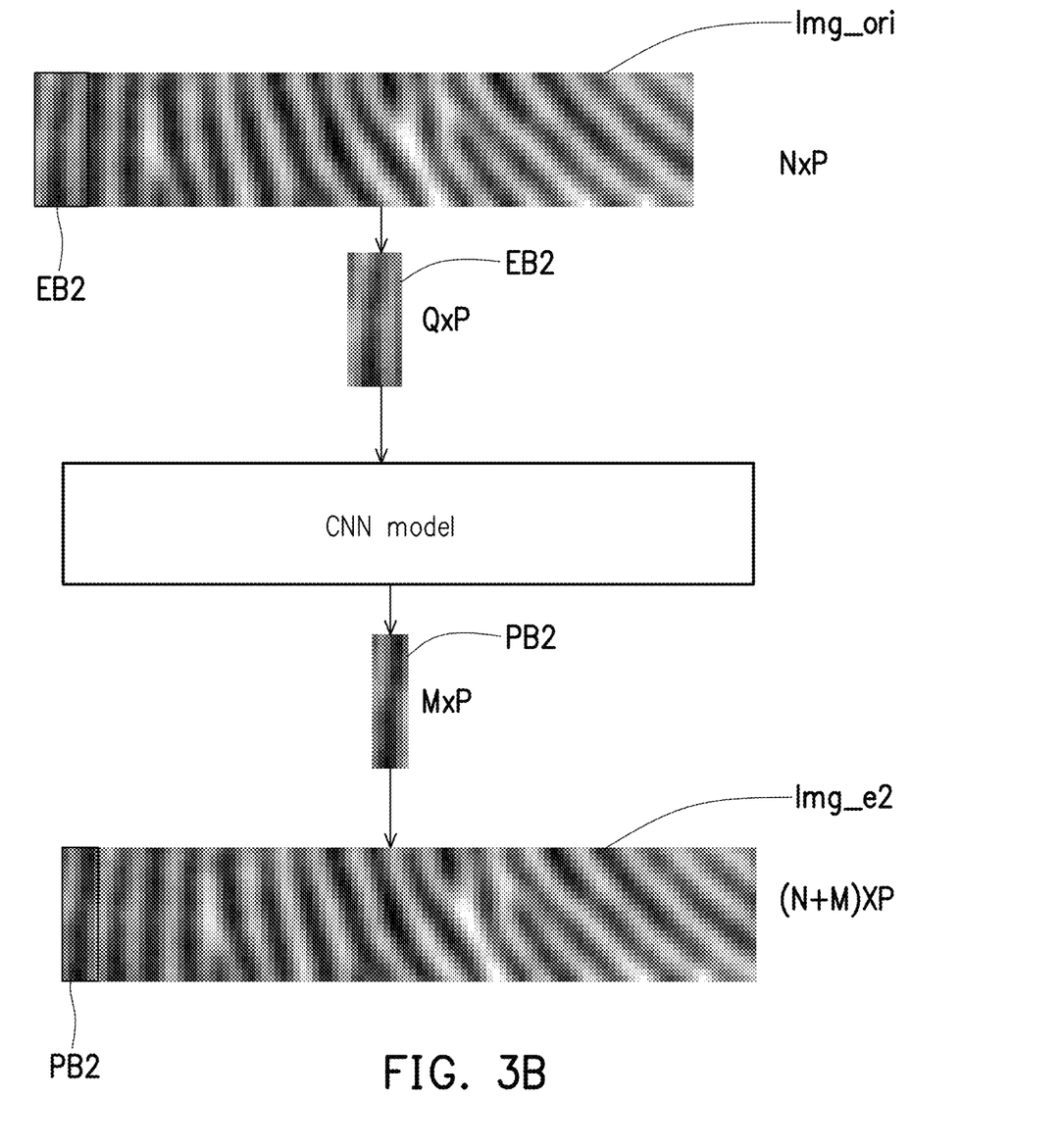
FIG. 3B is a schematic view of a fingerprint identification method according to an embodiment of the disclosure.

For example, FIG. 3B is a schematic view of a fingerprint identification method according to an embodiment of the disclosure. The fingerprint sensor 110 may generate an original fingerprint image Img_ori of the size N*P. The processor 130 selects an image edge block EB2 located at the left edge of the original fingerprint image Img_ori. Meanwhile, the size of the image edge block EB2 is Q*P, where Q is less than N. That is, the image edge block EB2 includes Q*P pixels. The processor 130 may input the image edge block EB2 to the neural network model, and the neural network model outputs a predicted extension block PB2. Meanwhile, the size of the predicted extension block PB2 is M*P, where M is less than Q. That is, the predicted extension block PB2 may include M*P predicted extension pixels. After merging the predicted extension block PB2 onto the left edge of the original fingerprint image Img_ori, the processor 130 may generate an extended fingerprint image Img_e2 of the size (N±M)*P.

Note that FIG. 3A and FIG. 3B are embodiments illustrating that the image edge blocks EB1 and EB2 are selected from certain edges of the original fingerprint image Img_ori and the corresponding predicted extension blocks PB1 and PB2 are generated, but the disclosure is not limited thereto. Based on the same principle and process, the processor 130 may select multiple image edge blocks from multiple edges of the original fingerprint image and correspondingly generate multiple predicted extension blocks.

In one embodiment, the processor 130 may input the image edge block to the neural network model, and the neural network model may directly output each prediction expansion pixel of the predicted extension block. That is, the processor 130 may directly predict a corresponding predicted extension block according to an image edge block of the original fingerprint image. For example, in the embodiments of FIG. 3A and FIG. 3B, the neural network model may directly output the complete predicted extension blocks PB1 and PB2.

In one embodiment, the processor 130 may input the image edge blocks to the neural network model, and the neural network model may output partial predicted extension block. Next, the processor 130 merges the image edge block with the partial predicted extension block to generate another image edge block and inputs the another image edge block to the neural network model, and the neural network model outputs another partial predicted extension block. That is, the processor 130 may first generate partial predicted expansion pixels of the predicted extension block through the neural network model according to an image edge block of the original fingerprint image, and then the processor 130 generates other partial predicted expansion pixels through the neural network model again according to part of the image edge block and the partial predicted extension block.

Figure 4:
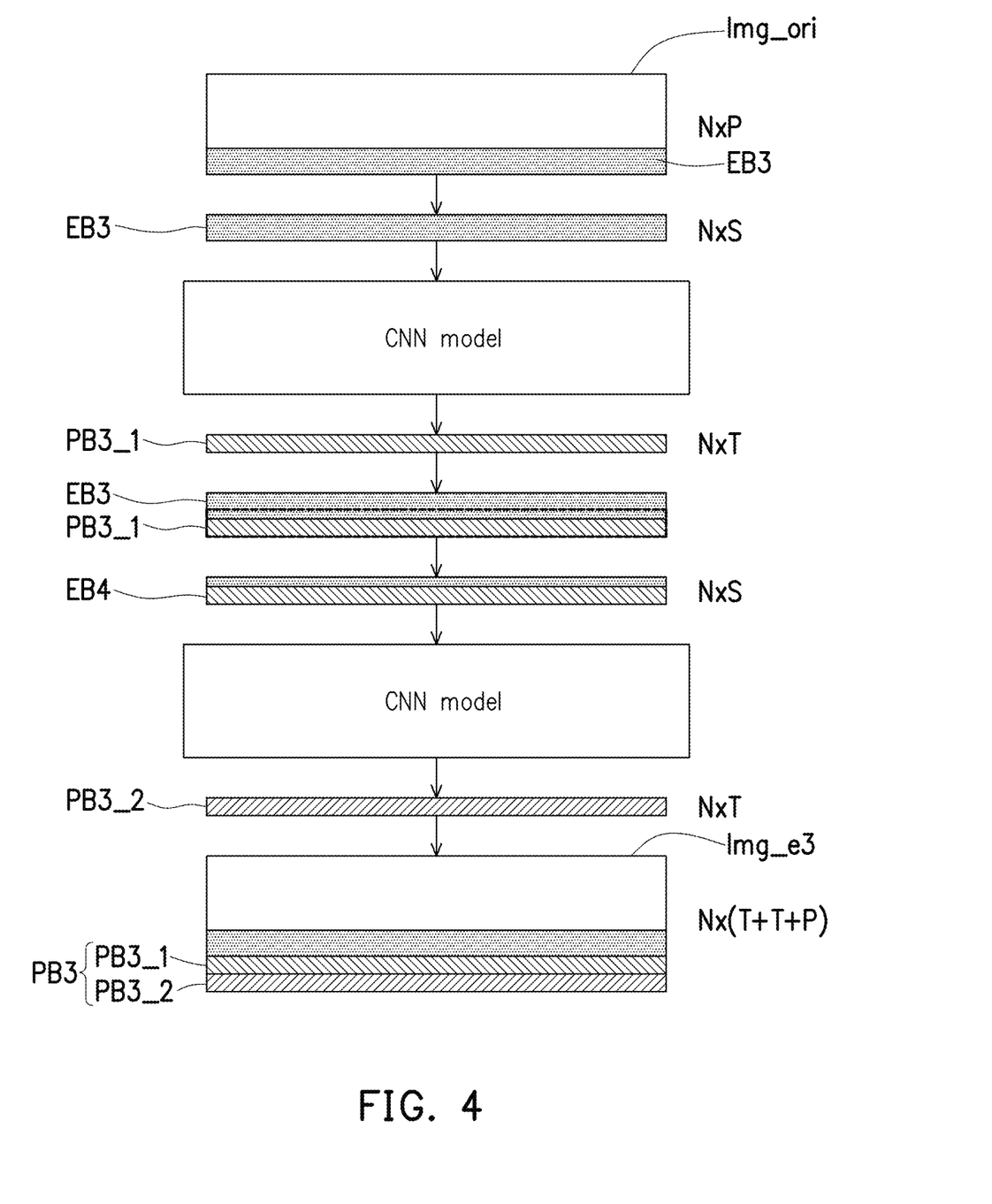
FIG. 4 is a schematic view illustrating a generation of a predicted extension block according to an embodiment of the disclosure.

For example, FIG. 4 is a schematic view illustrating a generation of a predicted extension block according to an embodiment of the disclosure. Referring to FIG. 4, assuming that the fingerprint sensor 110 may generate the original fingerprint image Img_ori of the size N*P, the processor 130 may adopt the neural network model to generate a first partial block PB3_1 of the predicted extension block according to the image edge block EB3 of the original fingerprint image Img_ori. Then, the processor 130 merges the image edge block EB3 with the first partial block PB3_1 to generate another image edge block EB4. Meanwhile, the image edge block EB4 includes part of the image edge block EB3 and the first partial block PB3_1. Next, the processor 130 inputs the another image edge block EB4 to the neural network model, and the neural network model outputs a second partial block PB3_2 of the predicted extension block to finally obtain the complete predicted extension block. Thus, the processor 130 may merge the first partial block PB3_1 and the second partial block PB3_2 of the predicted extension block in sequence with the original fingerprint image Img_ori to generate the extended fingerprint image Img_e3. Note that in FIG. 4, it is illustrated as an example that the neural network model is adopted to make two predictions to obtain the complete predicted extension block PB3, but the disclosure is not limited thereto. In other embodiments, based on similar principles and processes, the processor 130 may adopt the neural network model to make more predictions to obtain a complete predicted extension block.

In one embodiment, the processor 130 may merge the predicted extension block with the original fingerprint image to generate a temporary extended fingerprint image. The processor selects another image edge block located at an edge of the temporary extended fingerprint image. The processor inputs the another image edge block to the neural network model to generate another predicted extension block. The processor 130 merges the another predicted extension block with the temporary extended fingerprint image to generate an extended fingerprint image. Meanwhile, the processor 130 merges the predicted extension block with an edge of the original fingerprint image in the first direction and merges the another predicted extension block with an edge of the temporary extended fingerprint image in the second direction. The edge in the first direction extends in the first direction, and the edge in the second direction extends in the second direction. The first direction is different from the second direction. That is, the edge in the first direction and the edge in the second direction are a horizontal edge and a vertical edge, respectively.

In detail, when the processor 130 needs to add predicted extension blocks to the left and right sides and the upper and lower sides of the original fingerprint image, respectively, the processor 130 may predict the predicted extension blocks on the left and right sides of the original fingerprint image according to the partial expansion blocks on the upper and lower sides of the predicted extension blocks and the image edge blocks at the vertical edge of the original fingerprint image. Alternatively, when the processor 130 needs to add predicted extension blocks to the left and right sides and the upper and lower sides of the original fingerprint image, respectively, the processor 130 may predict the predicted extension blocks on the left and right sides of the original fingerprint image according to the partial predicted extension blocks on the left and right sides of the predicted extension blocks and the image edge blocks at the horizontal edge of the original fingerprint image.

Figure 5:
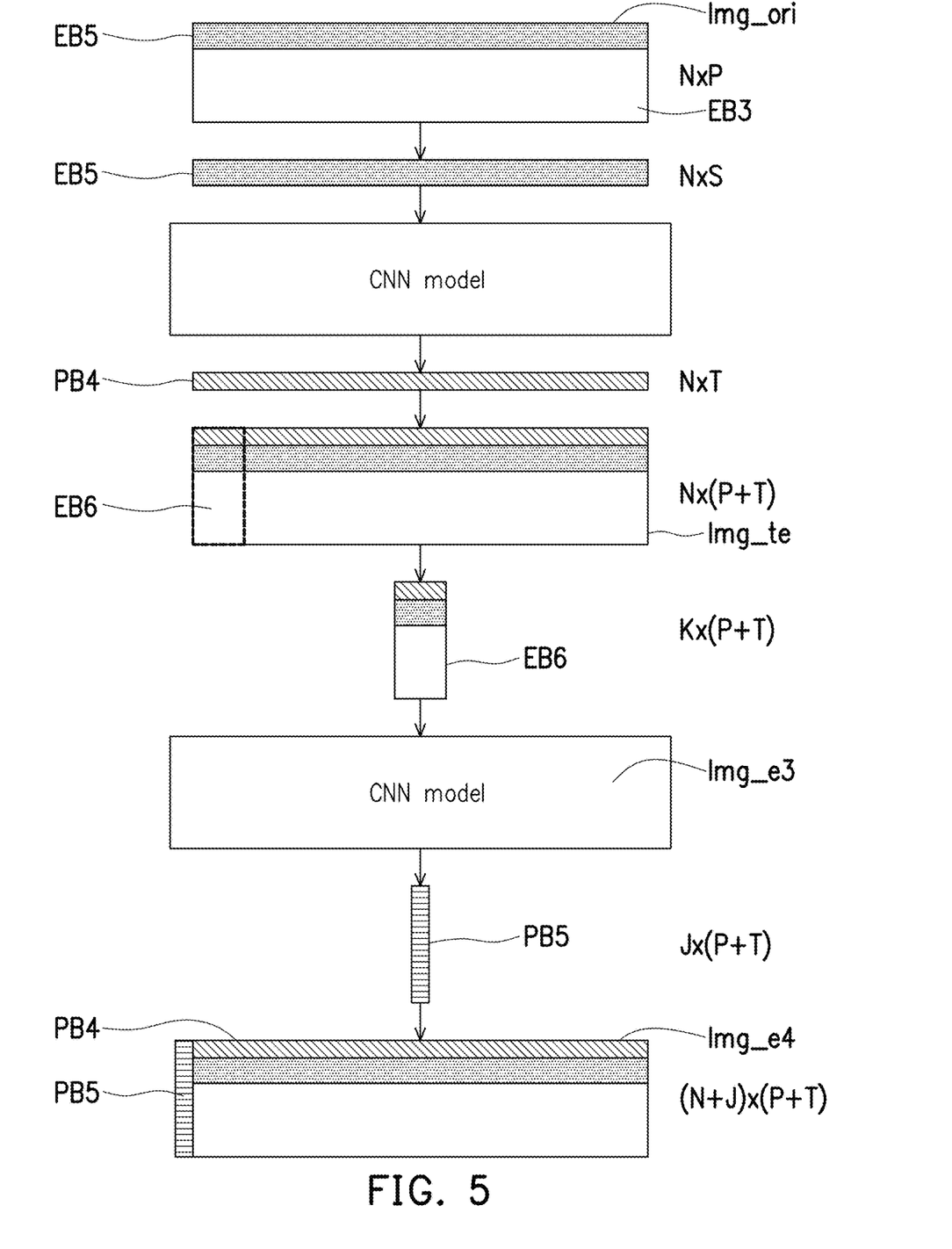
FIG. 5 is a schematic view illustrating generations of predicted extension blocks according to an embodiment of the disclosure.

For example, FIG. 5 is a schematic view illustrating generations of predicted extension blocks according to an embodiment of the disclosure. Referring to FIG. 5, assuming that the fingerprint sensor 110 may generate the original fingerprint image Img_ori of the size N*P, the processor 130 may adopt the neural network model to generate a predicted extension block PB4 according to the image edge block EB5 of the original fingerprint image Img_ori. Then, the processor 130 merges the original fingerprint image Img_ori with the predicted extension block PB4 to generate a temporary extended fingerprint image Img_te. The processor 130 selects another image edge block EB6 located at an edge of the temporary extended fingerprint image Img_te. The processor inputs the another image edge block EB6 to the neural network model to generate another predicted extension block PB5. The processor 130 merges the another predicted extension block PB5 with the temporary extended fingerprint image Img_te to generate an extended fingerprint image Img_e4. Note that in FIG. 5, it is illustrated as an example that the neural network model is adopted to first generate the predicted extension block at the horizontal edge and then the predicted extension block at the vertical edge, but the disclosure is not limited thereto.

In one embodiment, the neural network model includes multiple convolution layers. The disclosure does not limit the quantity of the convolution layers, which may be configured according to actual requirements. Each of the convolution layers performs convolution operations according to one or more convolution kernels. The first convolution layer in the neural network model receives the image edge blocks, and the last convolution layer in the neural network model performs convolution operations according to a convolution kernel to output part of or all of the predicted extension pixels of the predicted extension blocks. Note that, in one embodiment, the processor 130 may add padding blocks at opposite sides of the image edge block according to a preset input parameter and input the image edge blocks and the padding blocks to the first convolution layer in the convolution layers. The size of the padding block is determined according to the preset input parameter and the size of the image edge block. Meanwhile, the preset input parameter of the neural network model is determined according to the greater one between the image height and the image width of the original fingerprint image. In one embodiment, the preset input parameter of the neural network model includes the width of the input image of the neural network model.

In detail, the convolution operation may cause the size of the output data of the convolution layers to be less than the size of the input data of the convolution layers. Therefore, in one embodiment, in order to make the width of the output image of the neural network model equal to the quantity of pixel columns or the quantity of pixel rows of the original fingerprint image or those of the temporary extended fingerprint image, the processor 130 may add padding blocks at opposite sides of the image edge blocks. According to the operation of adding padding blocks according to the preset input parameter, the preset input parameter of the neural network model is determined according to the greater one between the image height and image width of the original fingerprint image, so the processor 130 may adopt a single neural network model to generate two predicted extension blocks in different sizes for the vertical edge and the horizontal edge of the original fingerprint image, respectively.

In the following paragraphs, the embodiments of adopting the neural network model to generate the predicted extension block are further illustrated.

Figure 6A:
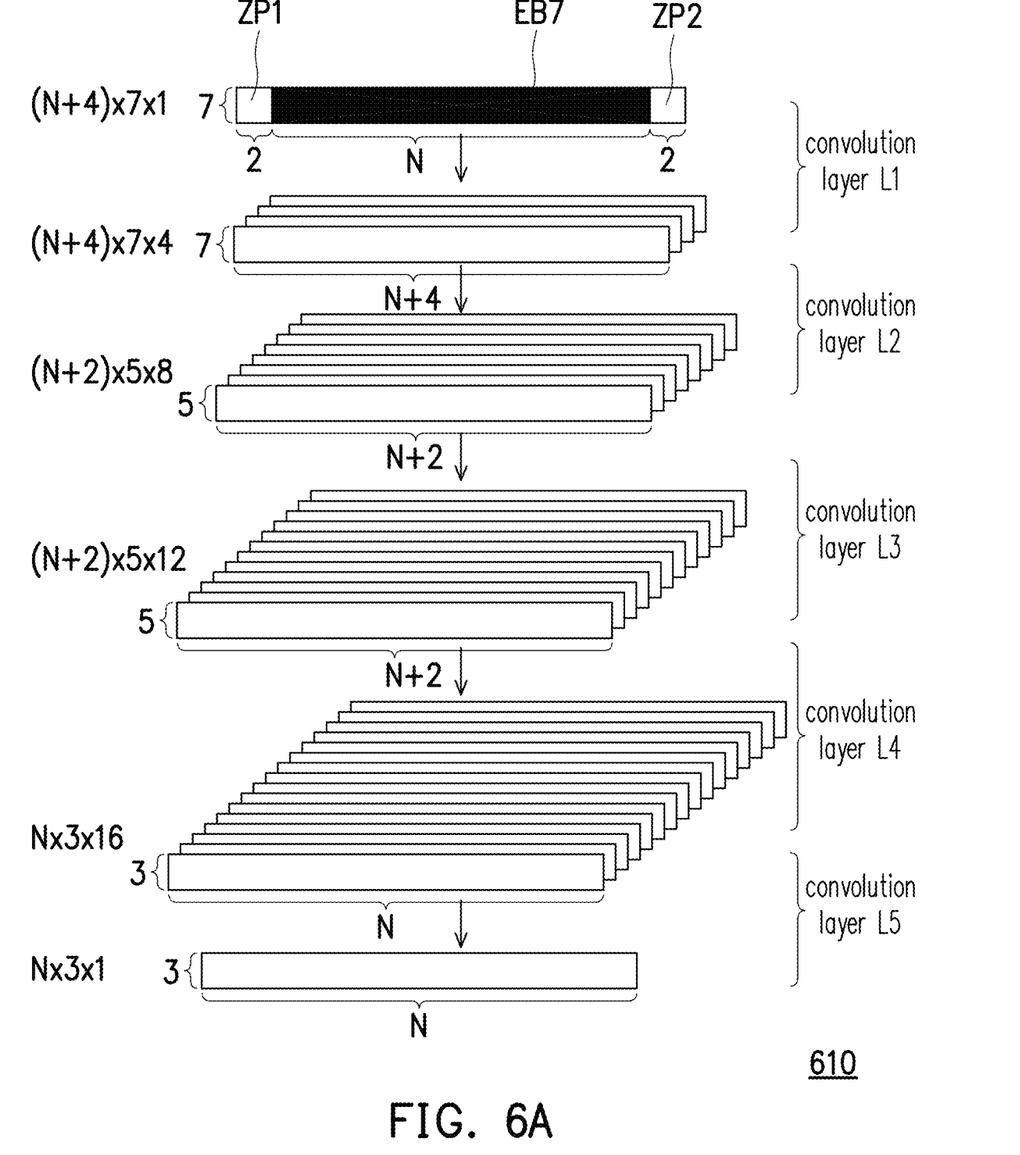
FIG. 6A is a schematic view of adopting a neural network model to generate predicted extension pixels of a predicted extension block according to an embodiment of the disclosure.

FIG. 6A is a schematic view of adopting a neural network model to generate predicted extension pixels of a predicted extension block according to an embodiment of the disclosure. Referring to FIG. 6A, a neural network model 610 may include five convolution layers L1 to L5, and each of the convolution layers L1 to L5 performs convolution operations according to one or more convolution kernels. In the embodiment, it is illustrated as an example that the height of the input image of the neural network model 610 is 7 and the height of the output image of the neural network model 610, but the disclosure is not limited thereto.

In the embodiment of FIG. 6A, assuming that the size of the original fingerprint image is N*P and the image width N is greater than the image height P, the processor 130 may determine that the preset input parameter of the neural network model 610 is equal to the sum of the image width N plus a constant parameter (the constant parameter is exemplified by 4). That is, the preset input parameter of the neural network model 610 is configured to be equal to N+4. In one embodiment, the constant parameter may be determined according to the height of the input image and the height of the output image of the neural network model 610. For example, in the embodiment of FIG. 6A, since the height of the input image of the neural network model 610 is 7 and the height of the output image of the neural network model 610 is 3, to ensure that the width of the output image of the neural network model 610 is equal to the quantity of pixel columns or the quantity of pixel rows of the original fingerprint image or those of the temporary extended fingerprint image, the processor 130 may determine that the constant parameter may be an even number greater than or equal to 4.

In the embodiment, under the condition that the preset input parameter of the neural network model 610 is equal to N+4, when an image edge block EB7 of the size N*7 is input to the neural network model 610, the processor 130 may determine that the size of padding blocks ZP1 and ZP2 which are adopted to be added at two sides of the image edge block EB7 is 2*7. In addition, the model parameters of the neural network model 610 may be as shown in Table 1, for example.

TABLE 1

| operation | | the size of the convolution kernel | the quantity of the convolution kernels | zero padding |
|---|---|---|---|---|
| convolution layer L1 | convolution operation | 3*3 | 4 | same |
| convolution layer L2 | convolution operation | 3*3 | 8 | valid |
| convolution layer L3 | convolution operation | 3*3 | 12 | same |
| convolution layer L4 | convolution operation | 3*3 | 16 | valid |
| convolution layer L5 | convolution operation | 3*3 | 1 | same |

In addition, each of the convolution layers L1 to L5 of the neural network model 610 shown in FIG. 6A and Table 1 performs convolution operations with a stride equal to 1 (stride=1), but the disclosure is not limited thereto. However, the model parameters shown in Table 1 are only exemplary descriptions to clearly illustrate the content of the embodiments of the disclosure rather than to limit the disclosure. The size of the convolution kernel, the quantity of the convolution kernels, the zero padding method, and the stride used in each of the convolution layers L1 to L5 of the neural network model may be configured according to actual requirements.

Figure 6B:
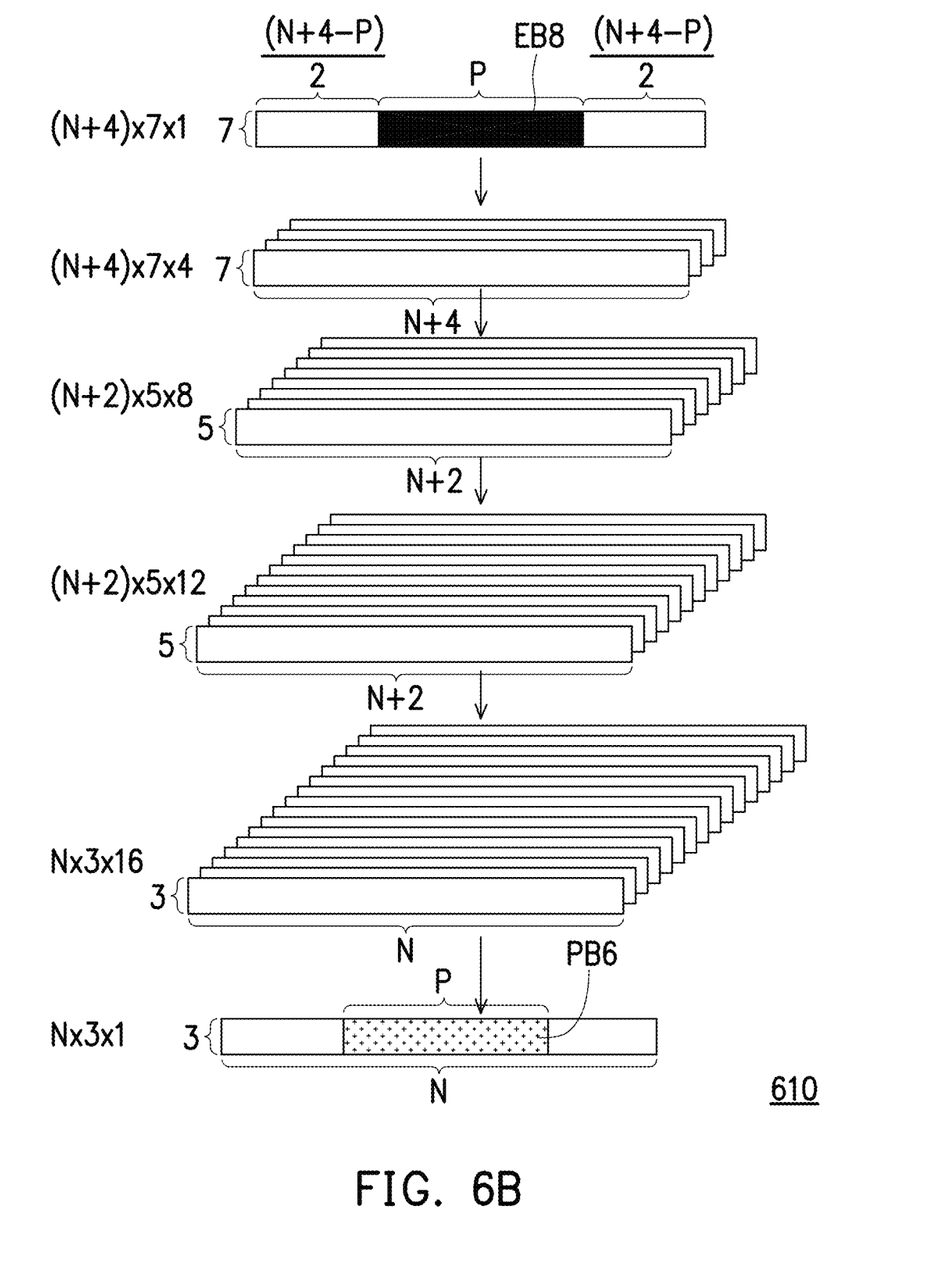
FIG. 6B is a schematic view of adopting a neural network model to generate predicted extension pixels of a predicted extension block according to an embodiment of the disclosure.

Note that the neural network model 610 may also be adopted to generate predicted extension blocks for edge image blocks at the vertical edge. For example, FIG. 6B is a schematic view of adopting a neural network model to generate predicted extension pixels of a predicted extension block according to an embodiment of the disclosure. Referring to FIG. 6B, assuming that the size of the original fingerprint image is N*P and the image width N is greater than the image height P, under the condition that the preset input parameter of the neural network model 610 is equal to N+4, when an image edge block EB8 of the size 7*P is input to the neural network model 610, the processor 130 may first rotate the image edge block EB8 of the size 7*P to generate an image edge block EB8 of the size P*7. Then, the processor 130 may determine that the size of padding blocks ZP3 and ZP4 to be added at two sides of the image edge block EB8 is (N+4-P)/2*7. After the convolution operation of the convolution layers L1 to L5, the processor 130 may select a predicted extension block PB6 of the size P*3 from the model output of the neural network model 610. The processor 130 may first rotate the predicted extension block PB6 of the size P*3 to generate a predicted extension block PB6 of the size 3*P to merge the predicted extension block PB6 of the size 3*P with the vertical edge of the original fingerprint image of the size N*P in the subsequent operations. According to FIG. 6A and FIG. 6B, in one embodiment, the same set of the trained neural network model may be adopted to generate predicted extension blocks in different sizes.

Note that, in one embodiment, the predicted extension block output by the neural network model may include a predicted fingerprint ridge or a predicted fingerprint valley. The predicted fingerprint ridge is not connected to any fingerprint ridge or any fingerprint valley in the original fingerprint image. That is, the predicted extension block may include predicted fingerprint lines that do not extend from fingerprint ridges or fingerprint valleys in the original fingerprint image. In detail, the neural network model of the embodiments in the disclosure may be trained and established according to various types of fingerprint orientations, so the neural network model of the embodiments in the disclosure may predict the bifurcation, turning, spiral, or other special directions of the fingerprint more accurately instead of simply extending the fingerprint ridges or fingerprint valleys in the fingerprint image.

Figure 7:
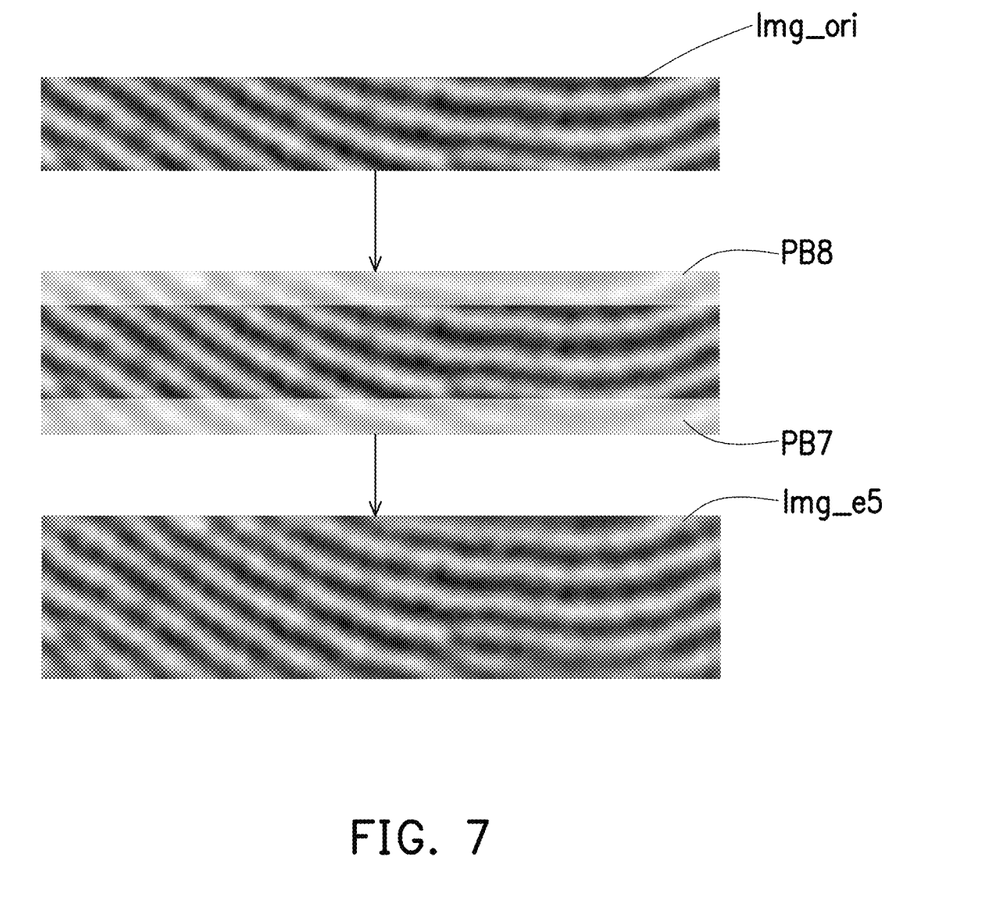
FIG. 7 is a schematic view of generating an extended fingerprint image according to an embodiment of the disclosure.

FIG. 7 is a schematic view of generating an extended fingerprint image according to an embodiment of the disclosure. Referring to FIG. 7, the original fingerprint image Img_ori is a small area fingerprint image with spiral fingerprints. In the embodiment, two image edge blocks located at the upper edge and the lower edge of the original fingerprint image Img_ori are respectively selected as the input data of the neural network model. The neural network model may output two corresponding predicted extension blocks PB7 and PB8, respectively. An extended fingerprint image Img_e5 may be generated by merging the predicted extension blocks PB7 and PB8 with the original fingerprint image Img_ori. In the embodiment of FIG. 7, the neural network model may accurately predict the spiral direction of the fingerprint to generate the extended fingerprint image Img_e5 with high reliability. More specifically, the predicted extension block PB8 includes predicted fingerprint lines that do not extend from fingerprint ridges and fingerprint valleys in the original fingerprint image Img_ori.

Based on the above, in the embodiments of the disclosure, the neural network model is trained to generate a predicted extension block according to the image edge blocks of the original fingerprint image. The predicted extension block may be merged with the original fingerprint image to generate an extended fingerprint image. The extended fingerprint image has more fingerprint features than the original fingerprint image. In this way, the success rate of fingerprint matching and the accuracy in fingerprint identification may be improved, and the problem of failing to smoothly stitch multiple fingerprint images may also be prevented. In addition, the neural network model is trained and established according to authentic fingerprint images, so it may accurately predict fingerprint information that is not sensed by the fingerprint sensor, ensuring the extended fingerprint image to have reliability to a certain degree.

It should be finally noted that the above embodiments are merely intended for describing the technical solutions of the present disclosure rather than limiting the present disclosure. Although the present disclosure is described in detail with reference to the foregoing embodiments, those of ordinary skill in the art should understand that they can still make modifications to the technical solutions described in the foregoing embodiments or make equivalent substitutions to some or all technical features thereof, without departing from scope of the technical solutions of the embodiments of the present disclosure.

What is claimed is:

1. A fingerprint sensing apparatus, comprising:
   a fingerprint sensor generating an original fingerprint image;
   a storage device; and
   a processor coupled to the fingerprint sensor and the storage device and configured to:
   select an image edge block located at an edge of the original fingerprint image;
   input the image edge block into a neural network model to generate a predicted extension block;
   generate an extended fingerprint image through merging the original fingerprint image with the predicted extension block; and
   execute a fingerprint application according to the extended fingerprint image.

2. The fingerprint sensing apparatus according to claim 1, wherein the predicted extension block comprises a plurality of predicted extension pixels, the processor inputs the image edge block to the neural network model, and the neural network model outputs each of the predicted extension pixels of the predicted extension block.

3. The fingerprint sensing apparatus according to claim 1, wherein the processor inputs the image edge block to the neural network model, the predicted extension block outputs part of the predicted extension block, and the processor merges the image edge block with part of the predicted extension block to generate another image edge block and input the another image edge block to the neural network model, so the neural network model outputs another part of the predicted extension block.

4. The fingerprint sensing apparatus according to claim 1, wherein the predicted extension block comprises a plurality of predicted extension pixels, and the processor merges the plurality of predicted extension pixels with a vertical edge or a horizontal edge of the original fingerprint image.

5. The fingerprint sensing apparatus according to claim 1, wherein the processor merges the predicted extension block with the original fingerprint image to generate a temporary extended fingerprint image, the processor selects another image edge block located at an edge of the temporary extended fingerprint image, the processor inputs the another image edge block to the neural network model to generate another predicted extension block, and the processor merges the another predicted extension block with the temporary extended fingerprint image to generate the extended fingerprint image.

6. The fingerprint sensing apparatus according to claim 1, wherein the fingerprint application comprises a fingerprint registration process or a fingerprint verification process.

7. The fingerprint sensing apparatus according to claim 1, wherein the neural network model comprises a plurality of convolution layers, the processor adds padding blocks on opposite sides of the image edge block according to a preset input parameter and inputs the image edge block and the padding blocks to a first convolution layer of the plurality of convolution layers, sizes of the padding blocks are determined according to the preset input parameter and a size of the image edge block, and the preset input parameter is determined according to a greater one between on an image height and an image width of the original fingerprint image.

8. The fingerprint sensing apparatus according to claim 1, wherein the predicted extension block comprises a predicted fingerprint ridge or a predicted fingerprint valley, the predicted fingerprint ridge is not connected to any fingerprint ridge in the original fingerprint image, and the predicted fingerprint valley is not connected to any fingerprint valley in the original fingerprint.

9. A fingerprint identification method, adapted for a fingerprint sensing apparatus, the method comprising:
   obtaining an original fingerprint image by the fingerprint sensor;
   capturing an image edge block located at an edge of the original fingerprint image;
   inputting the image edge block to a neural network model to generate a predicted extension block;
   generating an extended fingerprint image by merging the original fingerprint image with the predicted extension block; and
   executing a fingerprint application according to the extended fingerprint image.

10. The fingerprint identification method according to claim 9, wherein the predicted extension block comprises a plurality of predicted extension pixels, and the step of inputting the image edge block to the neural network model to generate the predicted extension block comprises:
    inputting the image edge block to the neural network model so that the neural network model outputs each of the plurality of predicted extension pixels of the predicted extension block.

11. The fingerprint identification method according to claim 9, wherein the step of inputting the image edge block to the neural network model to generate the predicted extension block comprises:
    inputting the image edge block to the neural network model so that the neural network model outputs part of the predicted extension block;
    merging the image edge block with the part of the predicted extension block to generate another image edge block; and
    inputting the another image edge block to the neural network model so that the neural network model outputs another part of the predicted extension block.

12. The fingerprint identification method according to claim 9, wherein the predicted extension block comprises a plurality of predicted extension pixels, and the step of generating the extended fingerprint image by merging the original fingerprint image with the predicted extension block comprises:
    merging the plurality of predicted extension pixels with a vertical edge or a horizontal edge of the original fingerprint image.

13. The fingerprint identification method according to claim 9, wherein the step of generating the extended fingerprint image by merging the original fingerprint image with the predicted extension block comprises:
    merging the predicted extension block with the original fingerprint image to generate a temporary extended fingerprint image;
    capturing another image edge block located at an edge of the temporary extended fingerprint image;
    inputting the another image edge block to the neural network model to generate another predicted extension block; and
    merging the another predicted extension block with the temporary extended fingerprint image to generate the extended fingerprint image.

14. The fingerprint identification method according to claim 9, wherein the fingerprint application comprises a fingerprint registration process or a fingerprint verification process.

15. The fingerprint identification method according to claim 9, wherein the neural network model comprises a plurality of convolution layers, the processor adds padding blocks on opposite sides of the image edge block according to a preset input parameter and inputs the image edge block and the padding blocks to a first convolution layer of the plurality of convolution layers, sizes of the padding blocks are determined according to the preset input parameter and a size of the image edge block, and the preset input parameter is determined according to a greater one between on an image height and an image width of the original fingerprint image.

16. The fingerprint identification method according to claim 9, wherein the predicted extension block comprises a predicted fingerprint ridge or a predicted fingerprint valley, the predicted fingerprint ridge is not connected to any fingerprint ridge in the original fingerprint image, and the predicted fingerprint valley is not connected to any fingerprint valley in the original fingerprint.

* * * * *